(12) United States Patent
Miyazaki

(10) Patent No.: US 7,930,679 B2
(45) Date of Patent: Apr. 19, 2011

(54) SOURCE-CODE-GENERATION SUPPORTING METHOD AND COMPUTER PRODUCT

(75) Inventor: Hiroshi Miyazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1062 days.

(21) Appl. No.: 11/523,227

(22) Filed: Sep. 19, 2006

(65) Prior Publication Data
US 2007/0016889 A1   Jan. 18, 2007

Related U.S. Application Data

(63) Continuation of application No. PCT/JP2004/006168, filed on Apr. 28, 2004.

(51) Int. Cl.
*G06F 9/44* (2006.01)
(52) U.S. Cl. ......................... 717/108; 717/116
(58) Field of Classification Search ........... 717/106–108
See application file for complete search history.

(56) References Cited

U.S. PATENT DOCUMENTS

| | | | | |
|---|---|---|---|---|
| 5,630,131 | A * | 5/1997 | Palevich et al. | 717/108 |
| 5,671,416 | A * | 9/1997 | Elson | 717/106 |
| 5,675,801 | A * | 10/1997 | Lindsey | 717/108 |
| 5,699,310 | A * | 12/1997 | Garloff et al. | 717/108 |
| 6,006,028 | A * | 12/1999 | Aharon et al. | 703/21 |
| 6,070,007 | A * | 5/2000 | Simonyi | 717/106 |
| 6,591,272 | B1 * | 7/2003 | Williams | 707/102 |
| 6,671,730 | B1 | 12/2003 | Akatsu et al. | |
| 6,742,175 | B1 * | 5/2004 | Brassard | 717/107 |
| 2001/0037412 | A1 * | 11/2001 | Miloushev et al. | 709/315 |
| 2003/0212984 | A1 * | 11/2003 | Miyazaki et al. | 717/116 |

FOREIGN PATENT DOCUMENTS

| | | |
|---|---|---|
| JP | A 2-105222 | 4/1990 |
| JP | A 3-195193 | 8/1991 |
| JP | 4-024733 | 1/1992 |
| JP | A 4-75136 | 3/1992 |
| JP | 07036684 A * | 2/1995 |
| JP | 7-123452 | 5/1995 |
| JP | 08286901 A * | 11/1996 |
| JP | 9-297690 | 11/1997 |
| JP | 11-003216 | 1/1999 |
| JP | 11-219287 | 8/1999 |
| JP | 2001-188673 | 7/2001 |
| WO | WO 02/46921 | 6/2002 |

OTHER PUBLICATIONS

Kimito Takadate, "Domain Directed Parts Controlling Method", JP 07036684 A, English Translation.*
Hiroshi Kashiwaya, "Reutilizing System for Software Parts", JP 08286901 A, English Translation.*

* cited by examiner

*Primary Examiner* — Wei Y Zhen
*Assistant Examiner* — Chung Cheng
(74) *Attorney, Agent, or Firm* — Fujitsu Patent Center

(57) ABSTRACT

A first tree-structured data is generated based on a sequence diagram indicating a specification of a new source code to be generated. A second tree-structured data matching with the first tree-structured data is retrieved from a storing unit that stores at least an existing source code and tree-structured data corresponding to the existing source code. A source code corresponding to the second tree-structured data is acquired from the storing unit.

2 Claims, 16 Drawing Sheets

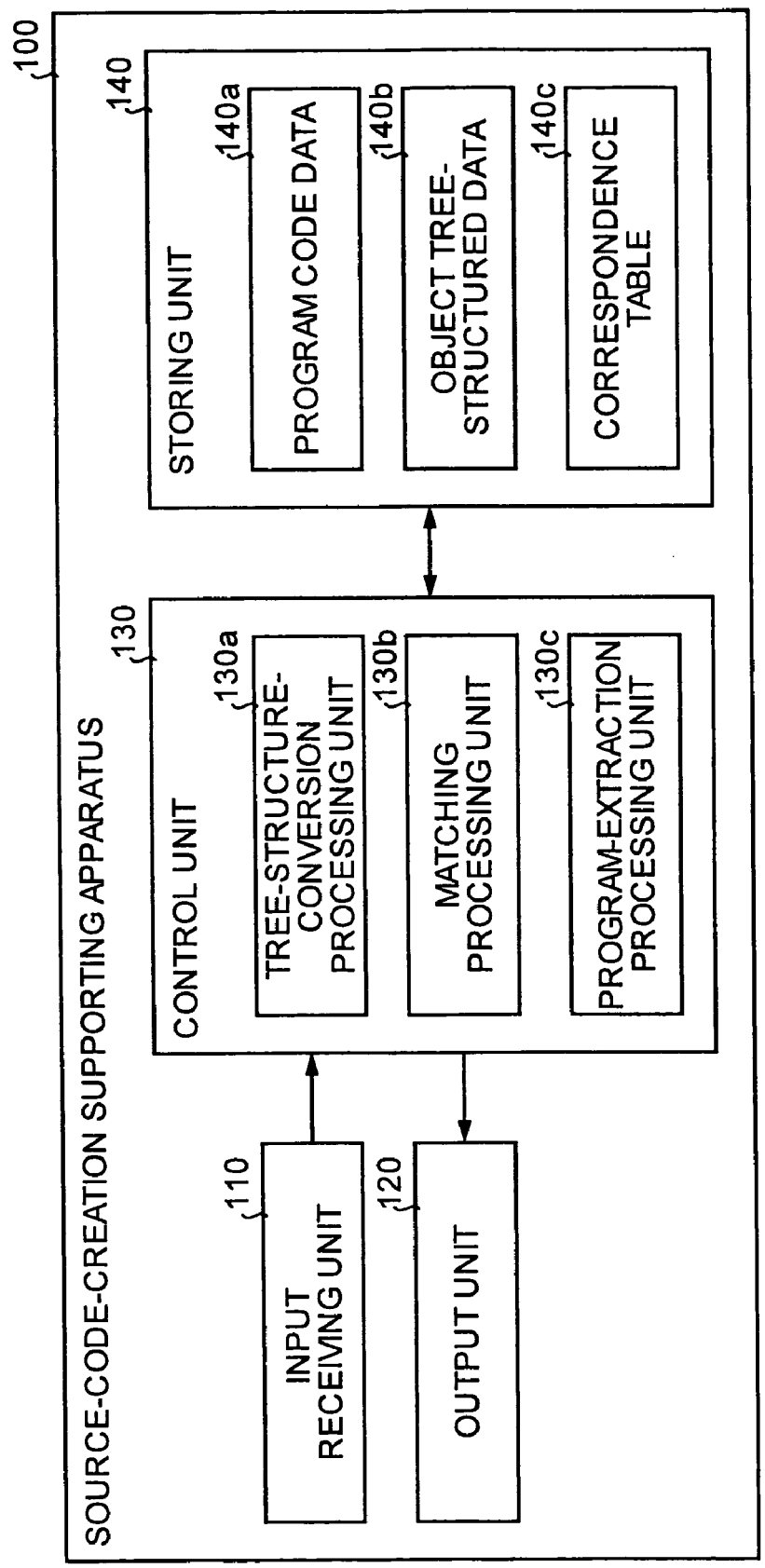

FIG.3

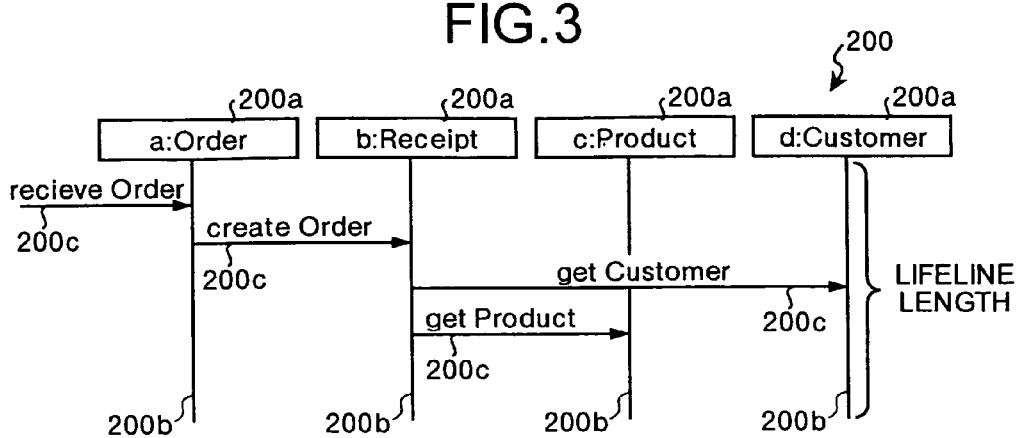

(INSTANCE LIST) 210

| TOP-LEFT COORDINATE | (x1,y1) | (x2,y2) | (x3,y3) | (x4,y4) |
|---|---|---|---|---|
| WIDTH | w1 | w2 | w3 | w4 |
| HEIGHT | h1 | h2 | h3 | h4 |
| INSTANCE INFORMATION | a:Order | b:Reciept | c:Product | d:Custom |
| LIFELINE LENGTH | L1 | L2 | L3 | L4 |
| LIFELINE COORDINATE | Lx1,Ly1 | Lx2,Ly2 | Lx3,Ly3 | Lx4,Ly4 |

(METHOD ARROW LIST) 220

| START-POINT COORDINATE | (a1,b1) | (a2,b2) | (a3,b3) | (a4,b4) |
|---|---|---|---|---|
| METHOD NAME | recieveOrder | createOrder | getCustomer | getProduct |
| LENGTH | l1 | l2 | l3 | l4 |
| LINE TYPE | Solid | Solid | Solid | Solid |
| CONNECTION SOURCE CLASS | - | a:Order | b:Reciept | b:Reciept |
| CONNECTION DESTINATION CLASS | a:Order | b:Reciept | d:Customor | c:Product |

FIG.6

CORRESPONDENCE TABLE

| CLASS NAME | INSTANCE NAME |
|---|---|
| Order | a |
| Receipt | b |
| Product | c |
| Customer | d |

SOURCE-CODE-GENERATION SUPPORTING METHOD AND COMPUTER PRODUCT

This is a continuation of International Application No. PCT/JP2004/006168, filed Apr. 28, 2004.

BACKGROUND OF THE INVENTION

1. Field of the Invention

The present invention relates to a technology for supporting generation of a source code based on object orientation with a capability of improving an efficiency of program development by reusing an existing source code.

2. Description of the Related Art

Recently, program codes are generated based on object oriented techniques to make program developments efficient. According to the object oriented techniques, data and processing are stored as one object, and a program code is described by sending a message for invoking the processing to the object.

On the other hand, there is an attempt to automatically generate a program code corresponding to a specification based on the specification of the program code desired by a user. However, since a processing logic for generating the program code is incomplete, only a template of the program code desired by the user can be generated (see, for example, Japanese Patent Application Laid-Open No. H11-219287). That is, to generate a complete program code, the user has to overwrite the program code using a simple script language.

To solve this problem, there is proposed a technique in which a program code and a configuration of the program code are generated in association with each other, and when a user edits the configuration, the editing on the configuration is reflected in the corresponding program code, thereby enabling generation of a new program code (see, for example, Japanese Patent No. 3299259). In addition, Japanese Patent Application Laid-Open No. H11-3216 discloses a technique that automatically manages consistency of a specification relating to the program code.

In the conventional techniques, however, a program code equivalent to a new program code to be generated needs to be described beforehand, which imposes a heavy burden on users.

Furthermore, when a new program code that does not correspond to the configuration of the pre-generated program code is generated, the new program code cannot be generated by editing the configuration, and users need to newly generate the program code, thereby deteriorating the efficiency of program code generation.

SUMMARY OF THE INVENTION

It is an object of the present invention to at least partially solve the problems in the conventional technology.

A computer-readable recording medium according to one aspect of the present invention stores therein a computer program for supporting generation of a source code based on object orientation. The computer program causes a computer to execute generating first tree-structured data based on a sequence diagram indicating a specification of a new source code to be generated; retrieving second tree-structured data matching with the first tree-structured data from a storing unit that stores at least an existing source code and tree-structured data corresponding to the existing source code; and acquiring a source code corresponding to the second tree-structured data from the storing unit.

A source-code-generation supporting method according to another aspect of the present invention is for supporting generation of a source code based on object orientation. The source-code-generation supporting method includes generating first tree-structured data based on a sequence diagram indicating a specification of a new source code to be generated; retrieving second tree-structured data matching with the first tree-structured data from a storing unit that stores at least an existing source code and tree-structured data corresponding to the existing source code; and acquiring a source code corresponding to the second tree-structured data from the storing unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a mechanism block diagram of a configuration of a source-code-generation supporting apparatus;

FIG. 3 is one example of a list structure of a sequence diagram;

FIG. 6 is one example of a correspondence table;

DETAILED DESCRIPTION OF THE PREFERRED EMBODIMENTS

Exemplary embodiments of the present invention will be explained in detail below with reference to the accompanying drawings. The present invention is not limited to the embodiments. According to the present embodiment, while a source-code-generation supporting apparatus in which respective functions are configured physically independently is explained, the respective functions can be realized by software to be executed as a source-code-generation supporting program.

Figure 1:
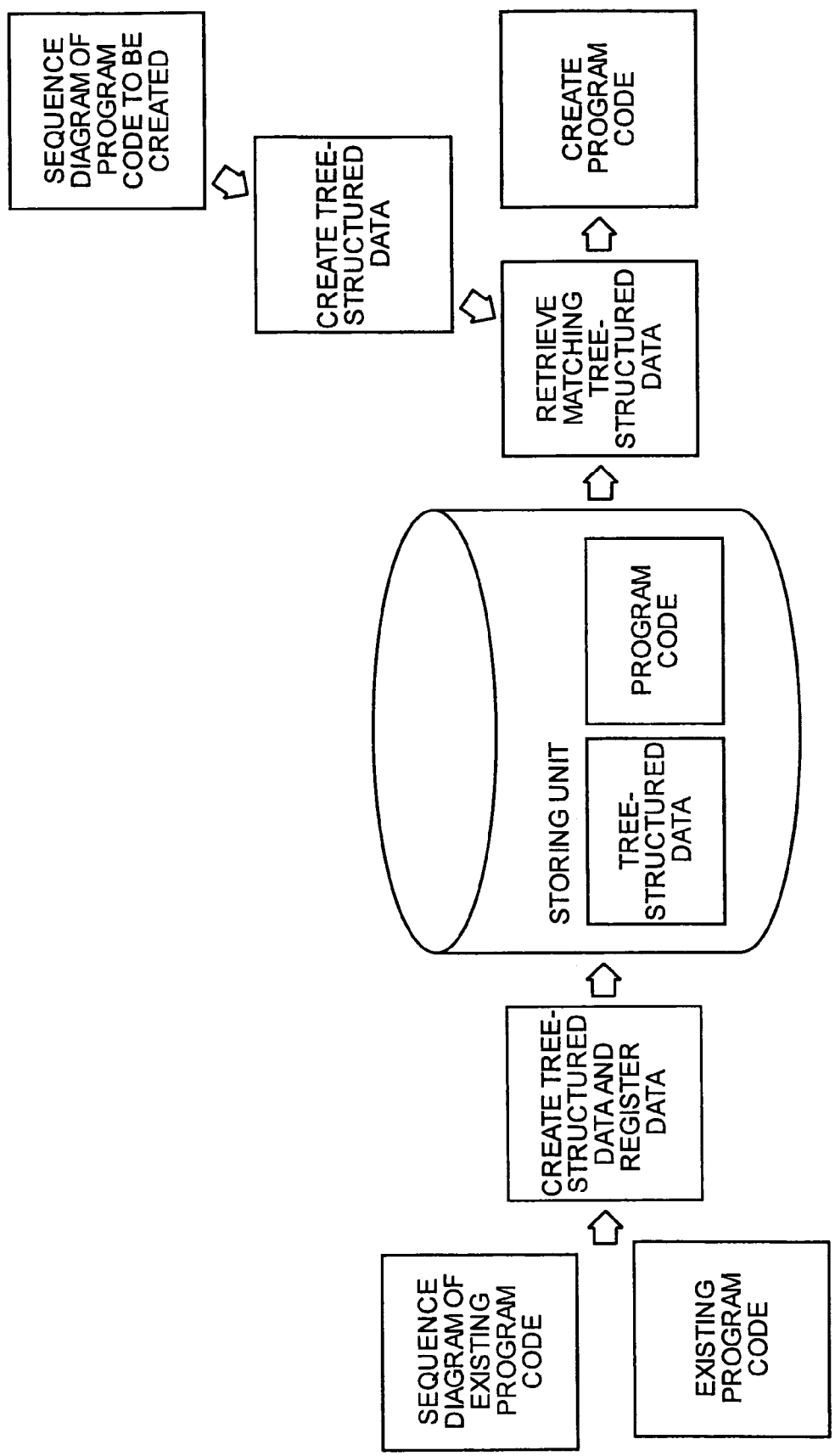
FIG. 1 depicts a concept of program reuse performed by a source code generation apparatus according to an embodiment.

FIG. 1 depicts the concept of program reuse performed by the source code generation apparatus according to the present embodiment. A program code is generated by object oriented techniques in the present embodiment.

The source-code-generation supporting apparatus in the present embodiment obtains beforehand an existing program code and a sequence diagram indicating a specification of the program code, to generate tree-structured data based on the obtained sequence diagram, and stores the tree-structured data and the program code in association with each other.

The tree-structured data is generated based on sequence information of a method and connection information of an instance by extracting a connection relationship between the instance included in the sequence diagram and the method. The instance is generated at the time of executing the program, using a class as a model. The method indicates a procedure to be performed between respective instances.

When a new program code is to be generated by reusing the existing program code, a sequence diagram of the program code to be newly generated is obtained, to generate tree-structured data based on the obtained sequence diagram, and tree-structured data matching with the generated tree-structured data is retrieved from the pre-generated tree-structured data.

A program code corresponding to the matching tree-structured data is extracted, and an instance name included in the extracted program code is replaced by a new instance name, thereby generating a new program code.

FIG. 2 is a functional block diagram of the configuration of a source-code-generation supporting apparatus 100. As shown in FIG. 2, the source-code-generation supporting apparatus 100 includes an input receiving unit 110, an output unit 120, a control unit 130, and a storing unit 140.

The input receiving unit 110 obtains data of the sequence diagram, program codes, and the like from an input device such as a keyboard (not shown), and sends the obtained data of the sequence diagram and the program code to the control unit 130. The input receiving unit 110 converts the data of the sequence diagram to a predetermined data structure (hereinafter, "sequence diagram data") and sends the converted data to the control unit 130.

FIG. 3 is one example of a list structure of the sequence diagram data. As shown in FIG. 3, the sequence diagram data includes an instance list 210 and a method arrow list 220. Reference sign 200 denotes a sequence diagram displayed by the sequence diagram data.

The instance list 210 includes "upper left coordinate", "width", "height", "instance information", "lifeline length", and "lifeline coordinate".

The "upper left coordinate" indicates a coordinate at an upper left corner of a box 200a expressing an instance, the "width" indicates a width of the box 200a expressing the instance, and the "height" indicates a height of the box 200a expressing the instance.

The "instance information" indicates an instance name and a class name including the instance name recorded on the box 200a expressing the instance. The "lifeline length" indicates a length of a lifeline 200b, and the "lifeline coordinate" indicates a coordinate of an apex of the lifeline 200b.

For example, the instance list indicating the instance box and the lifeline at the left end includes "(x1, y1)" as the "upper left coordinate", "w1" as the "width", "h1" as the "height", "a:Order" as the "instance information", "L1" as the "lifeline length", and "Lx1, Ly1" as the "lifeline coordinate". Explanations of other instance lists are omitted.

As shown in FIG. 3, the method arrow list 220 includes "start point coordinate", "method name", "length", "line type", "connection source class", and "connection destination class".

The "start point coordinate" indicates a coordinate at the left end of an arrow 200c, the "method name" indicates a name of a method expressed by an arrow, the "length" indicates a length of the arrow 200c, the "line type" indicates a type of the line of the arrow 200c, the "connection source class" indicates a connection source class name of the arrow 200c, and the "connection destination class" indicates a connection-destination class name of the arrow 200c.

For example, the method arrow list of an arrow at the left end includes "(a1, b1)" as the "start point coordinate", "recieveOrder" as the "method name", "11" as the "length", "Solid" as the "line type", "none" as the "connection source class", and "a:Order" as the "connection destination class". Explanations of other method arrow lists are omitted.

The output unit 120 receives the program code from the control unit 130, and outputs the received program code.

The control unit 130 generates tree-structured data, and reuses the existing program code to generate a new program code. The control unit 130 includes a tree-structure-conversion processing unit 130a, a matching processing unit 130b, and a program-extraction processing unit 130c.

The tree-structure-conversion processing unit 130a receives the sequence diagram data and the program code from the input receiving unit 110, and converts the received sequence diagram data to tree-structured data. The tree-structure-conversion processing unit 130a further makes the storing unit 140 store the program code and the tree-structured data as program code data 140a and object tree-structured data 140b, respectively.

When the tree-structure-conversion processing unit 130a makes the storing unit 140 store the program code and the tree-structured data, the tree-structure-conversion processing unit 130a attaches specifying information for specifying where the corresponding program code is stored (hereinafter, "program-code specifying information") to the tree-structured data.

Figure 4:
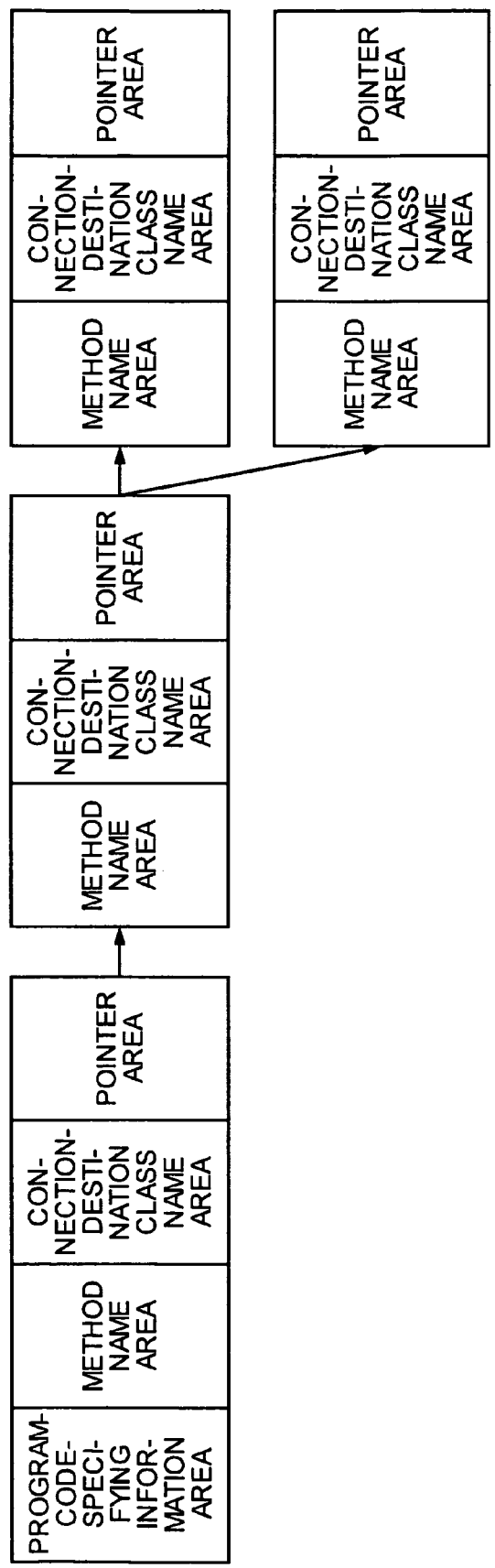
FIG. 4 is one example of a data structure of tree-structured data.

FIG. 4 is one example of a data structure of the tree-structured data. The tree-structured data shown in FIG. 4 includes a program-code specifying information area, a method name area, a connection-destination class name area, and a pointer area. Hereinafter, the method name area, the connection-destination class name area, and the pointer area are collectively referred to as a cell (a top cell of the tree-structured data includes the program-code specifying information area).

The program-code specifying information is stored in the program-code specifying information area, a method name is stored in the method name area, a connection-destination class name is stored in the connection-destination class name area, and an address of the cell which is connected next is stored in the pointer area. When there are plural cells to be connected next, a plurality of addresses are stored in the pointer area.

Figure 5:
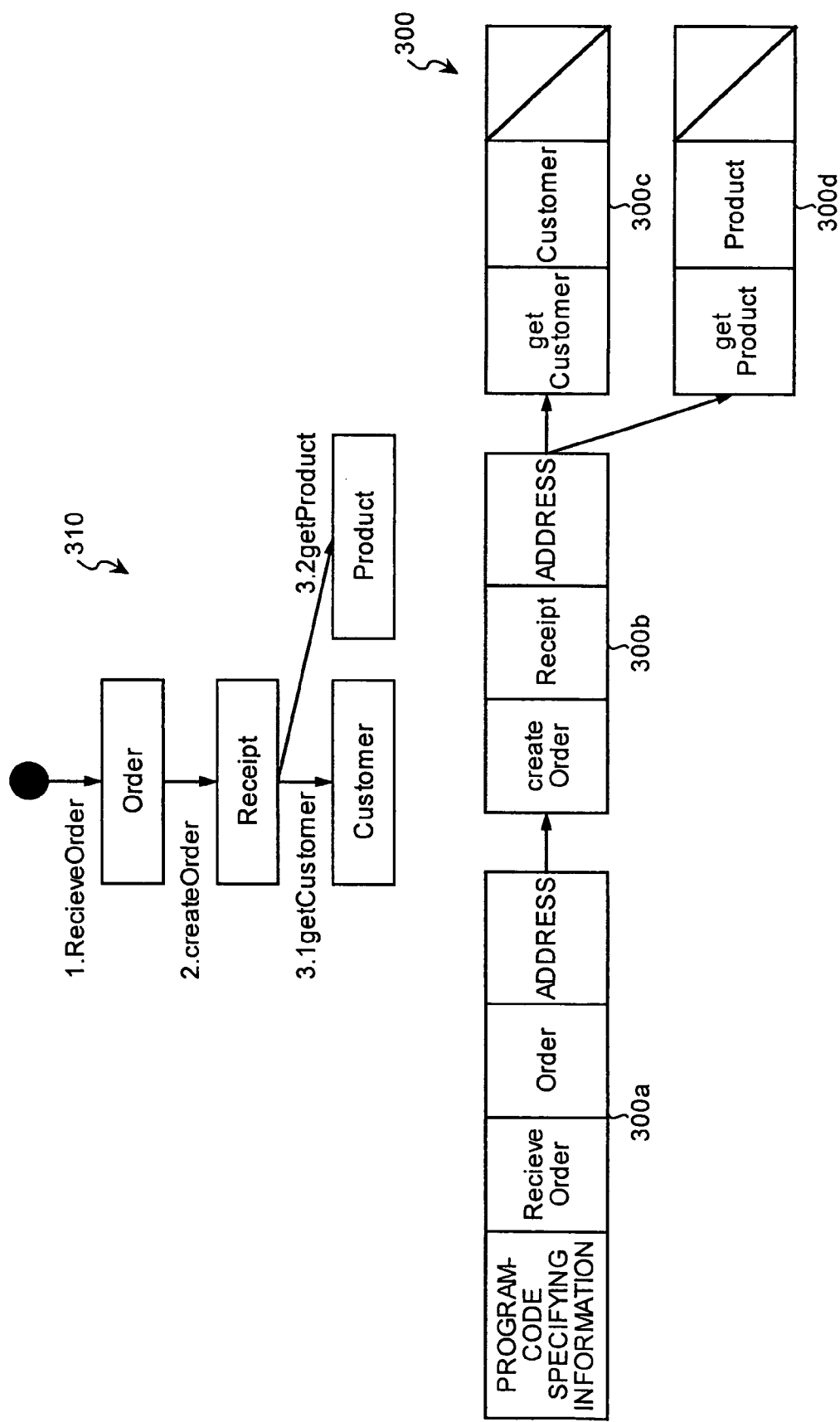
FIG. 5 depicts tree-structured data generated based on the sequence diagram data shown in FIG. 3.

When the tree-structured data is generated based on the sequence diagram data shown in FIG. 3, the tree-structured data becomes as shown by 300 in FIG. 5, and the tree-structured data 300 can be expressed as shown by reference number 310.

The tree-structured data 300 includes cells 300a to 300d. The "program-code specifying information" is stored in the program-code specifying information area in the cell 300a, "RecieveOrder" is stored in the method name area, "Order" is stored in the connection-destination class name area, and an "address of the cell 300b" is stored in the pointer area.

"GenerateOrder" is stored in the method name area of the cell 300b, "Receipt" is stored in the connection-destination class name area, and "addresses of the cells 300c and 300d" are stored in the pointer area.

"GetCustomer" is stored in the method name area of the cell 300c, and "Customer" is stored in the connection-destination class name area. Since there is no subsequent cell, data is not stored in the pointer area of the cell 300c.

"GetProduct" is stored in the method name area of the cell 300d, and "Product" is stored in the connection-destination class name area. Since there is no subsequent cell, data is not stored in the pointer area of the cell 300d, similarly to the cell 300c.

The tree-structure-conversion processing unit 130a generates a correspondence table representing correspondence between respective class names and instance names, based on the instance names and the class names included in the instances in the sequence diagram data, and stores a generated correspondence table 140c in the storing unit 140.

FIG. 6 is one example of the correspondence table. As shown in FIG. 6, the correspondence table 140c includes class names and instance names.

Specifically, an instance name corresponding to the class name "Order" is "a", an instance name corresponding to the class name "Receipt" is "b", an instance name corresponding to the class name "Product" is "c", and an instance name corresponding to the class name "Customer" is "d". The correspondence table is used by the program-extraction processing unit 130c, which is described later.

Upon reception of sequence diagram data indicating a specification of the program code to be newly generated (hereinafter, "generated sequence diagram data") by reusing the existing program code, the tree-structure-conversion processing unit 130a converts the received generated sequence diagram data to tree-structured data, sends the converted tree-structured data to the matching processing unit 130b, and sends the generated sequence diagram data to the program-extraction processing unit 130c.

Upon reception of the tree-structured data from the tree-structure-conversion processing unit 130a, the matching processing unit 130b retrieves tree-structured data matching with the received tree-structured data from the object tree-structured data 140b in the storing unit 140.

Figure 7:
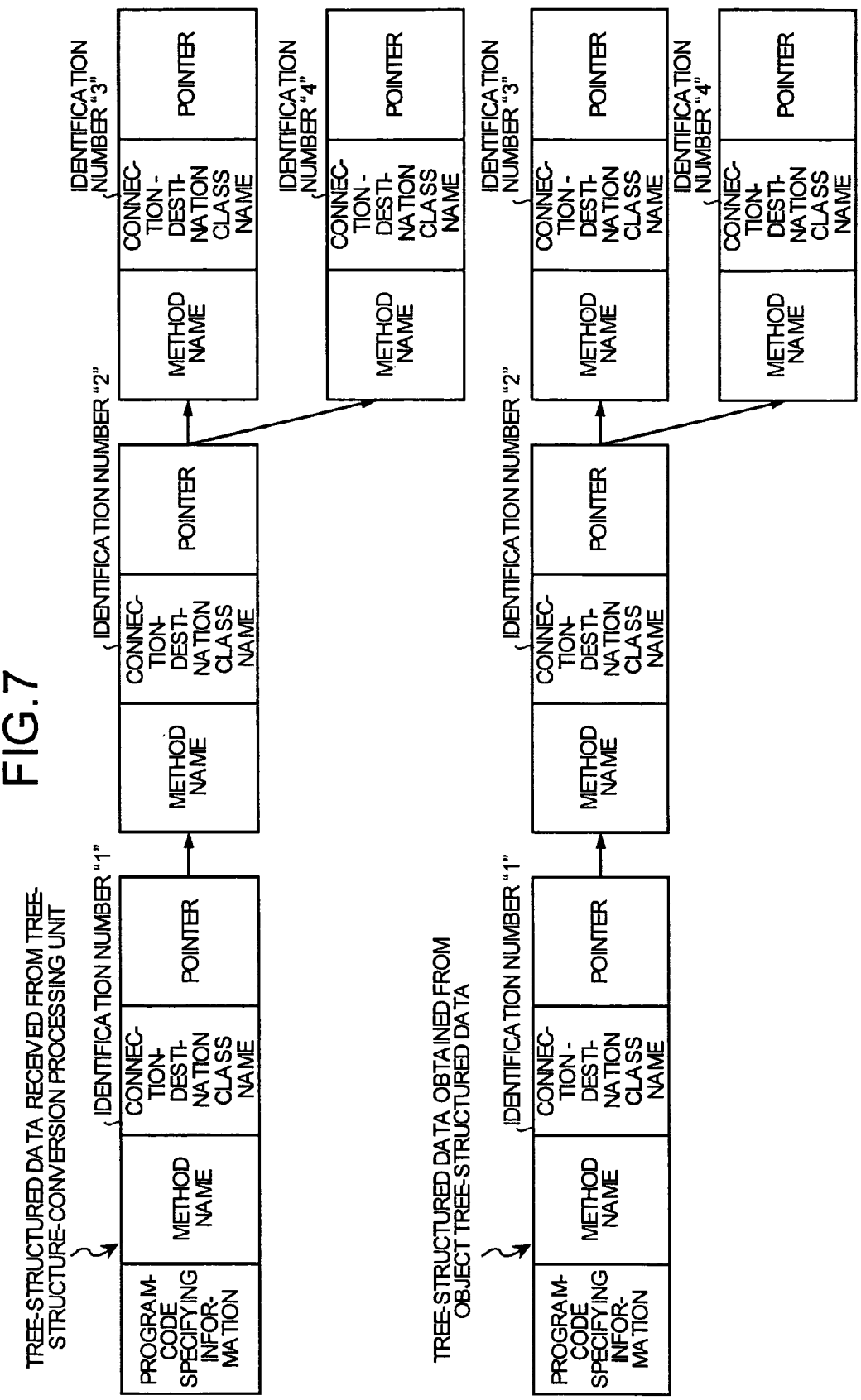
FIG. 7 is an explanatory diagram of allocation of identification numbers with respect to cells in respective tree-structured data.

Specifically, as shown in FIG. 7, the matching processing unit 130b analyzes the connection relationship of cells included in the tree-structured data received from the tree-structure-conversion processing unit 130a and the tree-structured data obtained from the object tree-structured data 140b, and allocates an identification number to each cell in the respective tree-structured data.

The allocation procedure of the identification number is such that an identification number "1" is allocated to a top cell in the tree-structured data, and an identification number "2" is allocated to a cell next to the cell allocated with identification information "1".

When plural cells are connected in the same layer, the identification number is allocated in order of recording of addresses included in the pointer in the connection source cell.

For example, with respect to the tree-structured data 300 shown in FIG. 5, identification numbers 1, 2, 3, and 4 are allocated to cells in order of cell 300a, cell 300b, cell 300c, and cell 300d.

The matching processing unit 130b then determines, sequentially, whether the method name and the connection-destination class name are the same in the both tree-structured data with respect to the cell having the same identification number, and when the method name and the connection-destination class name of all the cells are the same, determines that the tree-structured data agree with each other. The matching processing unit 130b then sends the matching tree-structured data to the program-extraction processing unit 130c.

Figure 8:
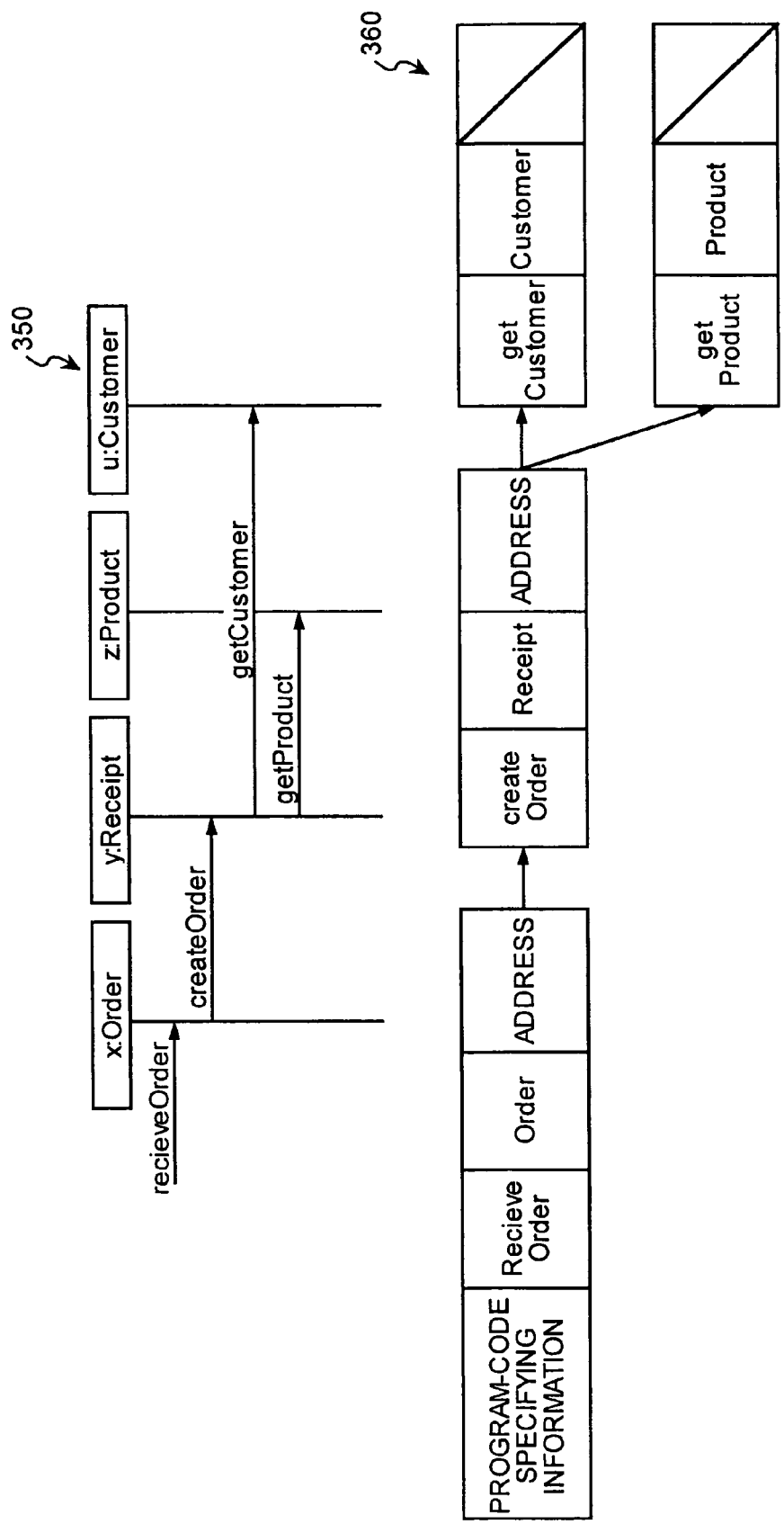
FIG. 8 is a generation sequence diagram and tree-structured data of the generation sequence diagram.

For example, tree-structured data 360 corresponding to a generation sequence diagram 350 shown in FIG. 8 matches with the tree-structured data 300 shown in FIG. 5. Therefore, the matching processing unit 130b sends the tree-structured data 300 to the program-extraction processing unit 130c.

The program-extraction processing unit 130c obtains the tree-structured data from the matching processing unit 130b, and retrieves a program code corresponding to the tree-structured data from the program code data 140 based on the program-code specifying information included in the obtained tree-structured data.

The program-extraction processing unit 130c then replaces the instance name included in the program code by a new instance name based on the detected program code and the correspondence table 140c, and sends the replaced program code to the output unit 120.

Figure 9:
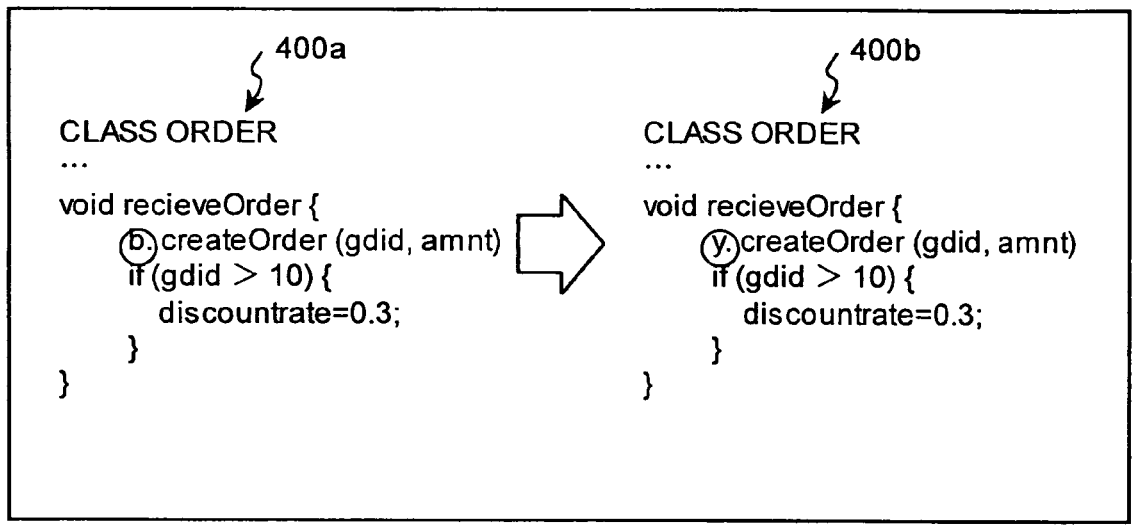
FIG. 9 is an explanatory diagram of conversion of an instance name of a program code.

For example, upon reception of the tree-structured data 300, the program-extraction processing unit 130c can extract a program code 400b (shown in FIG. 9) corresponding to the tree-structured data 300 from the program specifying information included in the tree-structured data 300.

When the program-extraction processing unit 130c retrieves the class corresponding to the instance "b" in the program code 400b based on the correspondence table 140c, it is found that the class corresponding to the instance "b" is "Receipt".

Accordingly, since the instance of the class "Receipt" in the generated sequence diagram data shown in FIG. 8 is "y", the program-extraction processing unit 130c converts the instance in the program code 400a from "b" to "y", to generate a new program code 400b.

That is, a program code corresponding to the sequence diagram can be generated only by specifying a sequence diagram of the specification of the program code to be newly generated, without the need to generate a program code from the initial stage.

Although detailed explanations are omitted in the present embodiment, when the number of identification numbers allocated to the tree-structured data received from the tree-structure-conversion processing unit 130a does not agree with the number of identification numbers allocated to the tree-structured data obtained from the object tree-structured data 140b, it is determined that the both tree-structured data do not match with each other.

Figure 10:
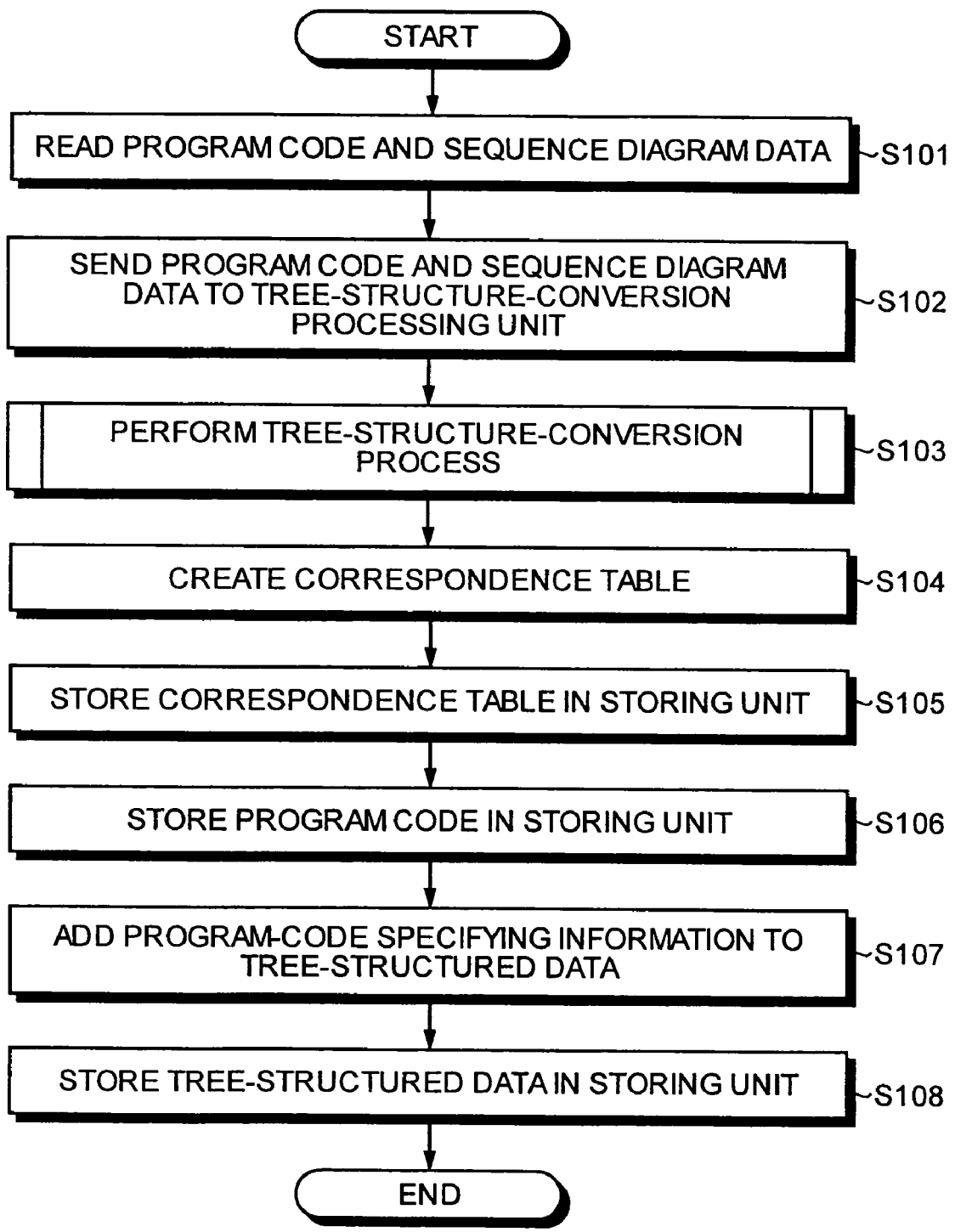
FIG. 10 is a flowchart of a process procedure in a preparation process.

A preparation process in which the tree-structure-conversion processing unit 130a makes the storing unit 140 store the tree-structured data and the program code corresponding to the tree-structured data beforehand is explained. FIG. 10 is a flowchart of a process procedure in the preparation process.

As shown in FIG. 10, the input receiving unit 110 reads the program code and the sequence diagram (step S101), and sends the program code and the sequence diagram data to the tree-structure-conversion processing unit 130a (step S102).

The tree-structure-conversion processing unit 130a performs tree-structure-conversion process (step S103) to generate a correspondence table (step S104) to make the storing unit 140 store the correspondence table (step S105).

The tree-structure-conversion processing unit 130*a* makes the storing unit 140 store the program code (step S106), adds the program-code specifying information to the tree-structured data (step S107), so that the tree-structured data is stored in the storing unit 140 (step S108).

Figure 11:
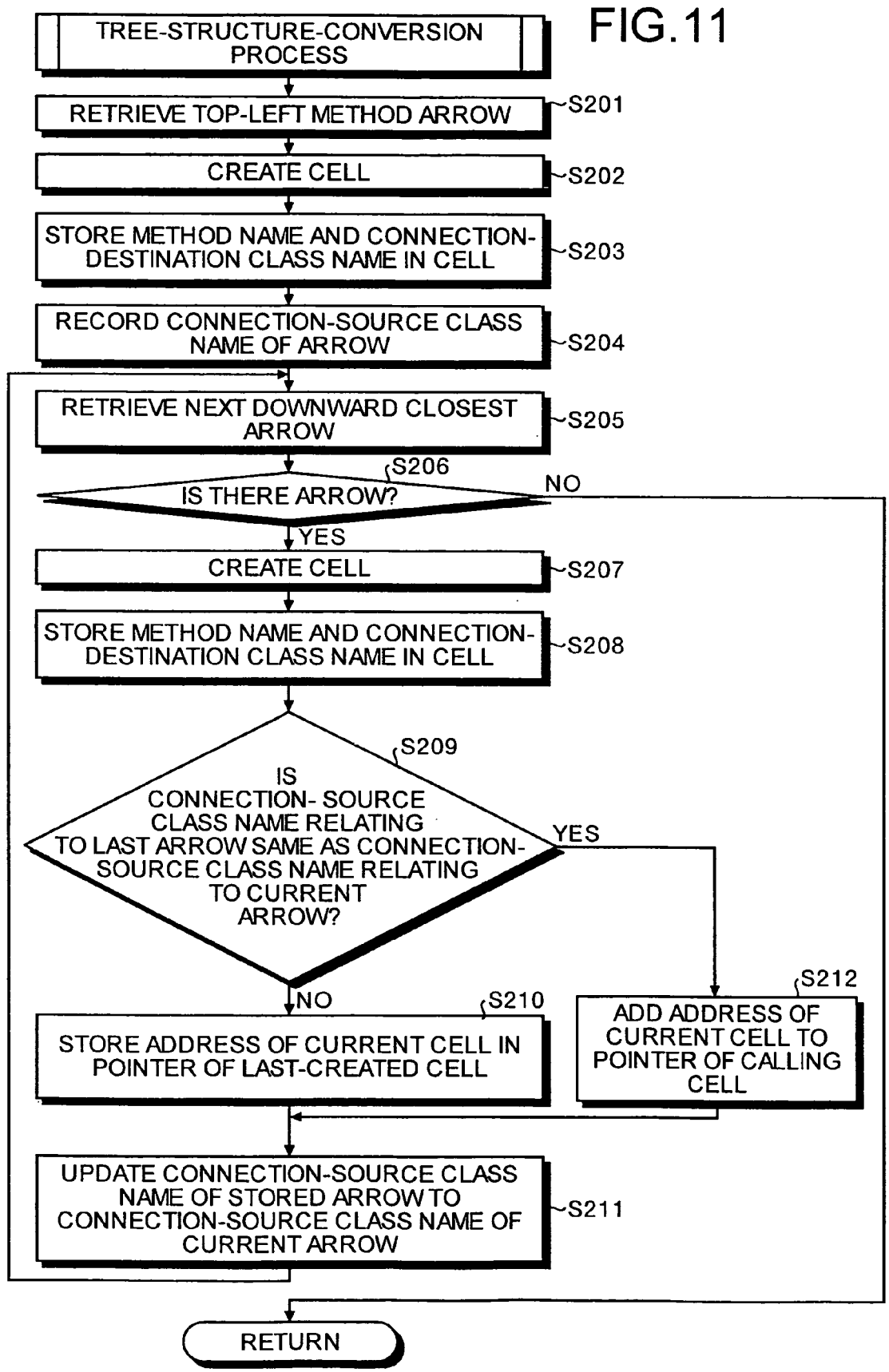
FIG. 11 is a flowchart of a process procedure in a tree-structure-conversion process.

FIG. 11 is a flowchart of a process procedure in the tree-structure-conversion process. As shown FIG. 11, the tree-structure-conversion processing unit 130*a* searches the leftmost and uppermost method arrow in the sequence diagram (step S201) to generate a cell (step S202), stores the method name and the connection-destination class name in the cell (step S203), and records the connection source class name of the arrow (step S204). (Although omitted in the above explanation, the tree-structure-conversion processing unit 130*a* stores the connection source class name of the searched arrow.)

The tree-structure-conversion processing unit 130*a* searches the next downward closest arrow (step S205), determines whether there is such an arrow (step S206), and when there is no such arrow (step S206, No), finishes the tree-structure-conversion process.

On the other hand, when there is such an arrow (step S206, Yes), the tree-structure-conversion processing unit 130*a* generates a cell (step S207), and stores a method name and a connection-destination class name in the cell (step S208), to determine whether a connection source class name relating to an arrow immediately before is the same as the connection source class name of the current arrow (step S209).

When the connection source class name relating to the arrow immediately before is not the same as the connection source class name of the current arrow (step S209, No), the tree-structure-conversion processing unit 130*a* stores the address of the current cell in the pointer of the cell generated immediately before (step S210), updates the connection source class name of the recorded arrow to the connection source class name of the current arrow (step S211), and proceeds to step S205.

On the other hand, when the connection source class name relating to the arrow immediately before is the same as the connection source class name relating to the current arrow (step S209, Yes), the tree-structure-conversion processing unit 130*a* adds the address of the current cell to the pointer of the calling cell (step S212), and proceeds to step S211.

Figure 12:
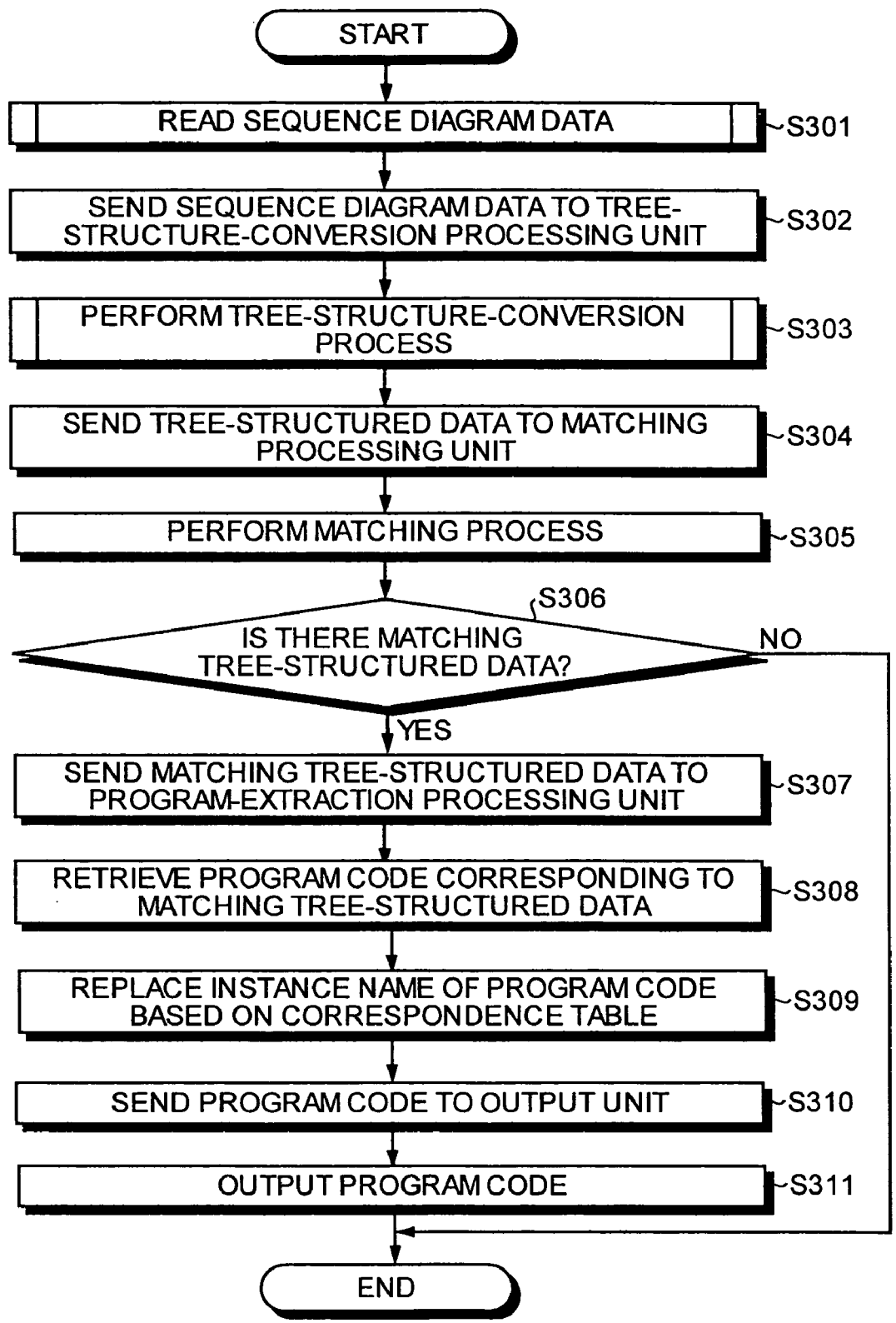
FIG. 12 is a flowchart of a process procedure in a program generation process.

FIG. 12 is a flowchart of a process procedure in the program generation process. As shown in FIG. 12, the input receiving unit 110 reads the sequence diagram (step S301) and sends the sequence diagram data to the tree-structure-conversion processing unit 130*a* (step S302). The tree-structure-conversion processing unit 130*a* performs tree-structure-conversion process (step S303) and sends the tree-structured data to the matching processing unit 130*c* (step S304).

The matching processing unit 130*c* performs a matching process (step S305), determines whether there is matching tree-structured data (step S306), and when there is no matching tree-structured data (step-S306, No), finishes the process.

On the other hand, when there is matching tree-structured data (step S306, Yes), the matching processing unit 130*c* sends the matching tree-structured data to the program-extraction processing unit 130*c* (step S307). The program-extraction processing unit 130*c* retrieves a program code corresponding to the matching tree-structured data (step S308), replaces the instance name of the program code based on the correspondence table (step S309), and sends the program code to the output unit 120 (step S310). The output unit 120 outputs the program code (step S311).

Since the tree-structure-conversion process at step S303 in FIG. 12 is the same as that shown in FIG. 11, the explanation thereof is omitted.

Figure 13:
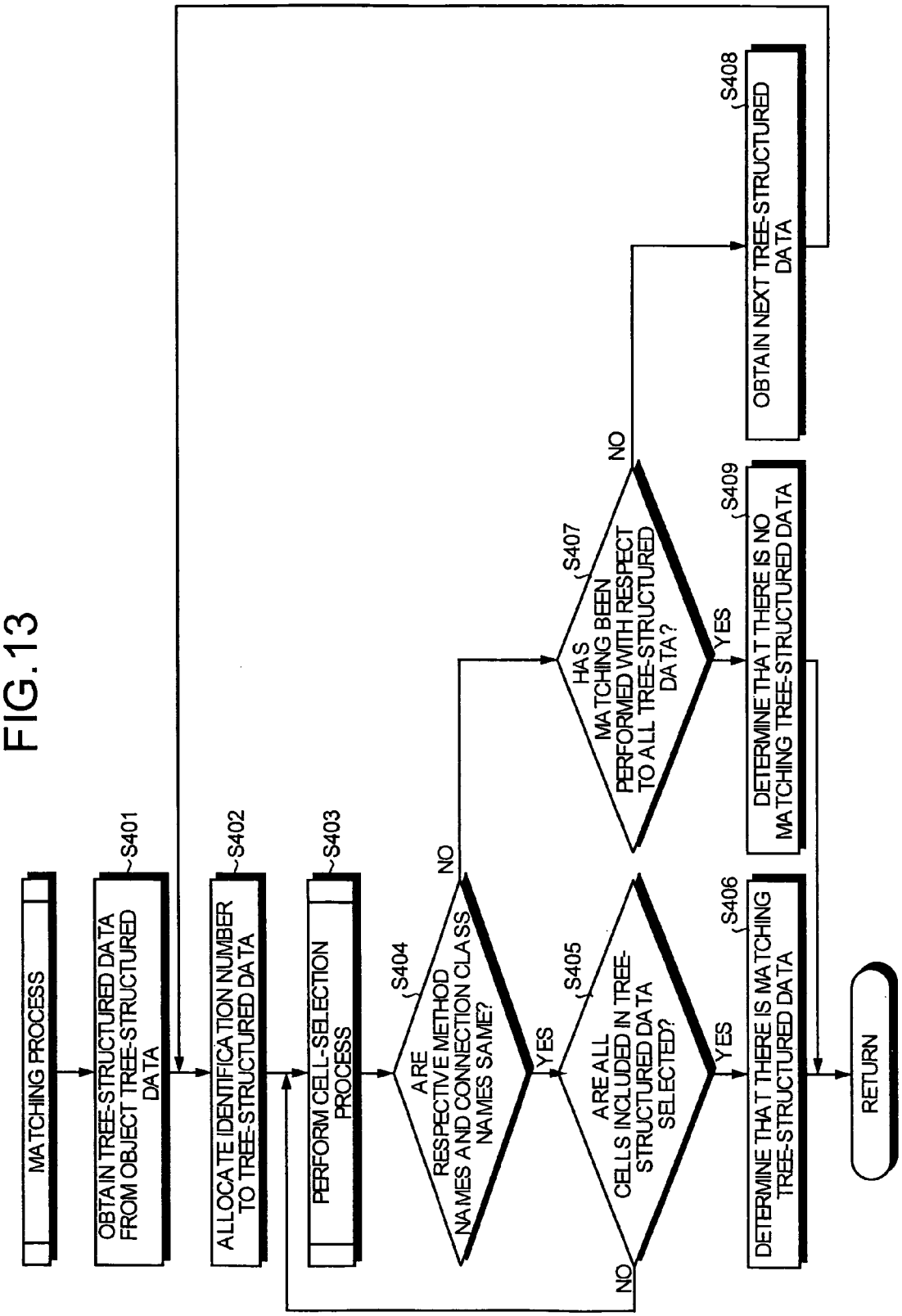
FIG. 13 is a flowchart of a process procedure in a matching process.

FIG. 13 is a flowchart of a process procedure in the matching process. As shown in FIG. 13, the matching processing unit 130*b* obtains the tree-structured data from the object tree-structured data 140*b* (step S401), allocates an identification number to the tree-structured data (step S402), and performs a cell selection process (step S403), to determine whether the respective method names and connection-destination class names are the same between the both tree-structured data (step S404).

When the respective method names and connection-destination class names are the same (step S404, Yes), the matching processing unit determines whether all the cells included in the tree-structured data have been selected (step S405). When all the cells included in the tree-structured data have not been selected (step S405, No), the process proceeds to step S403. When all the cells included in the tree-structured data have been selected (step S405, Yes), the matching processing unit determines that there is matching tree-structured data (step S406).

On the other hand, when the respective method names and the connection-destination class names are not the same (step S404, No), the matching processing unit determines whether matching has been performed with respect to all the tree-structured data (step S407). When matching has not yet been performed with respect to all the tree-structured data (step S407, No), the matching processing unit obtains the next tree-structured data from the object tree-structured data 140*b* (step S408), and proceeds to step S402.

On the other hand, when matching has been performed with respect to all the tree-structured data (step S407, Yes), the matching processing unit determines that there is no matching tree-structured data (step S409).

Figure 14:
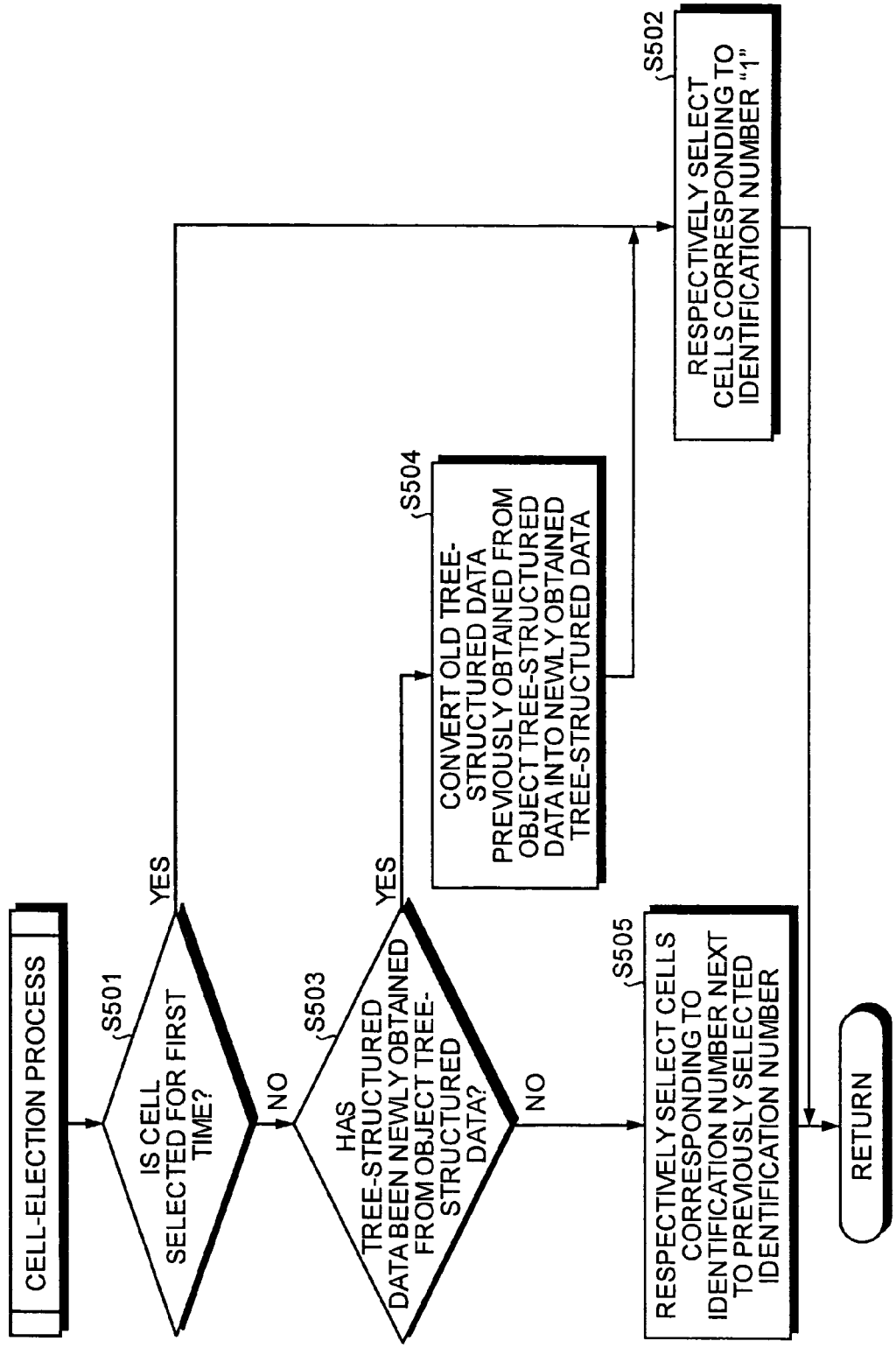
FIG. 14 is a flowchart of a process procedure in a cell selection process.

FIG. 14 is a flowchart of a process procedure in the cell selection process. As shown in FIG. 14, the matching processing unit 130*b* determines whether a cell included in the tree-structured data received from the tree-structure-conversion processing unit 130*a* and a cell included in the tree-structured data obtained from the object tree-structured data 140*b* are to be selected for the first time (step S501). When the cells are to be selected for the first time (step S501, Yes), the matching processing unit 130*b* respectively selects cells corresponding to the identification number "1" from the both data (step S502).

On the other hand, when it is not the first time to select the cells (step S501, No), the matching processing unit 130*b* determines whether the tree-structured data has been newly obtained from the object tree-structured data 140*b* (step S503), and when the tree-structured data has been newly obtained from the object tree-structured data 140*b* (step S503, Yes), the matching processing unit 130*b* converts the old tree-structured data previously obtained from the object tree-structured data 140*b* to the newly obtained tree-structured data (step S504), and proceeds to step S502.

On the other hand, when the tree-structured data has not been newly obtained from the object tree-structured data (step S503, No), the matching processing unit 130*b* respectively selects cells corresponding to an identification number next to the previously selected identification number (step S505).

In the source-code-generation supporting program according to the present embodiment, the tree-structure-conversion processing unit 130*a* generates the tree-structured data based on the generated sequence diagram data, and the matching processing unit 130*b* retrieves tree-structured data matching with the generated tree-structured data from the object tree-structured data 140b. The program-extraction processing unit 130c then obtains a corresponding existing program code from the program-code specifying information in the matching tree-structured data, and replaces the instance name in the obtained program code by an instance name corresponding to the generated sequence diagram data. Accordingly, it is not necessary to develop the program code from scratch, and the program code can be generated only by specifying the sequence diagram. As a result, productivity of the program code can be improved.

Furthermore, since the program code corresponding to the sequence diagram can be automatically generated only by specifying the sequence diagram, even users having no knowledge of script language can easily generate the program code.

According to the present embodiment, the source-code-generation supporting apparatus 100 has been explained. However, by realizing the configuration of the source-code-generation supporting apparatus 100 by software, a source-code-generation supporting program having the same function can be obtained.

Figure 15:
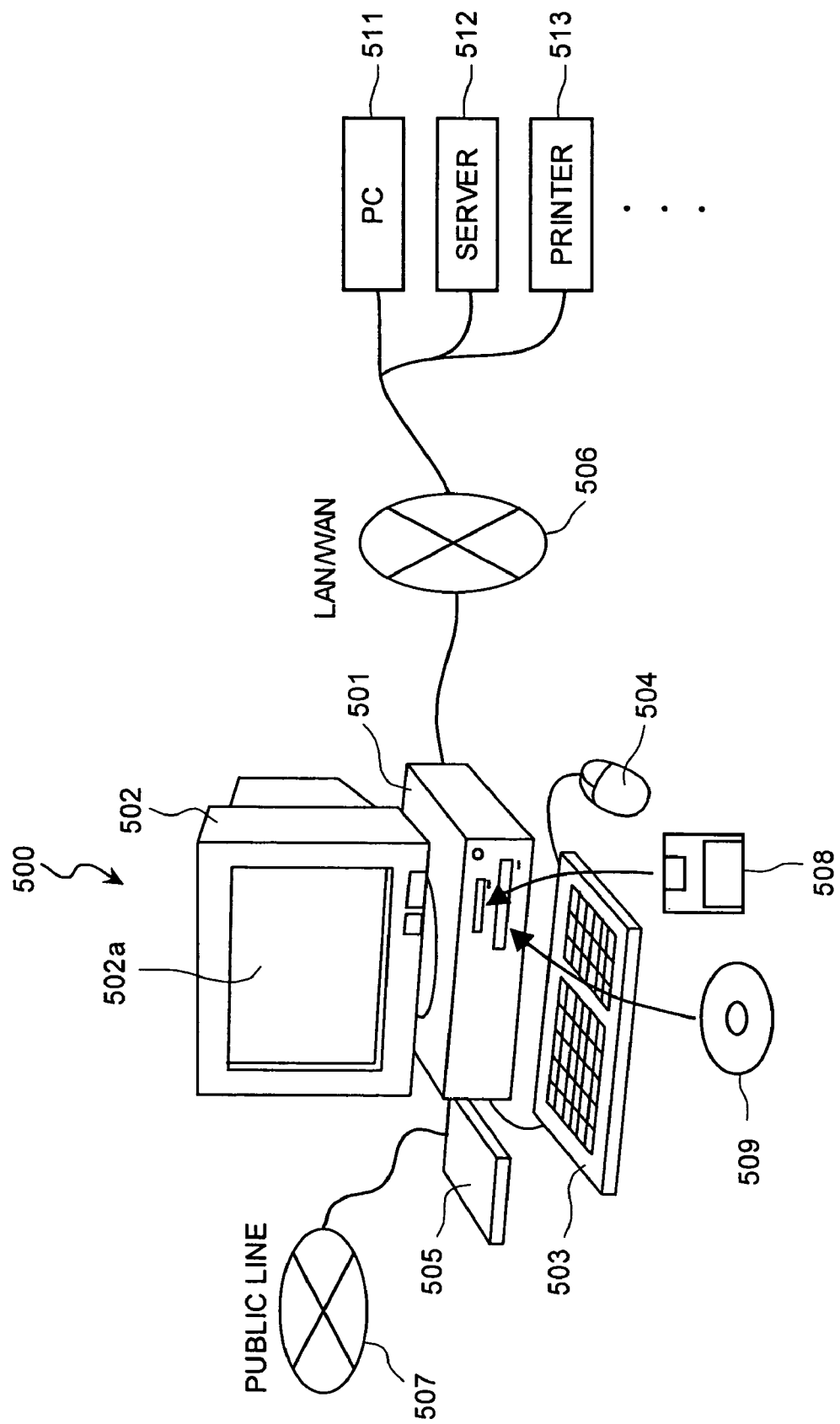
FIG. 15 depicts a computer system that executes a source-code-generation supporting program according to the embodiment.

FIG. 15 depicts a computer system that executes the source-code-generation supporting program according to the present embodiment. As shown in FIG. 15, a computer system 500 includes a main body unit 501, a display 502 that displays information on a display screen 502a according to an instruction from the main body unit 501, a keyboard 503 for inputting various types of information to the computer system 500, a mouse 504 for specifying an optional position on the display screen 502a of the display 502, a LAN interface connected to a LAN 506 or a wide area network (WAN), and a modem 505 connected to a public line 507. The LAN 506 connects between the computer system 500 and other computer systems (PC) 511, a server 512, a printer 513, and the like.

Figure 16:
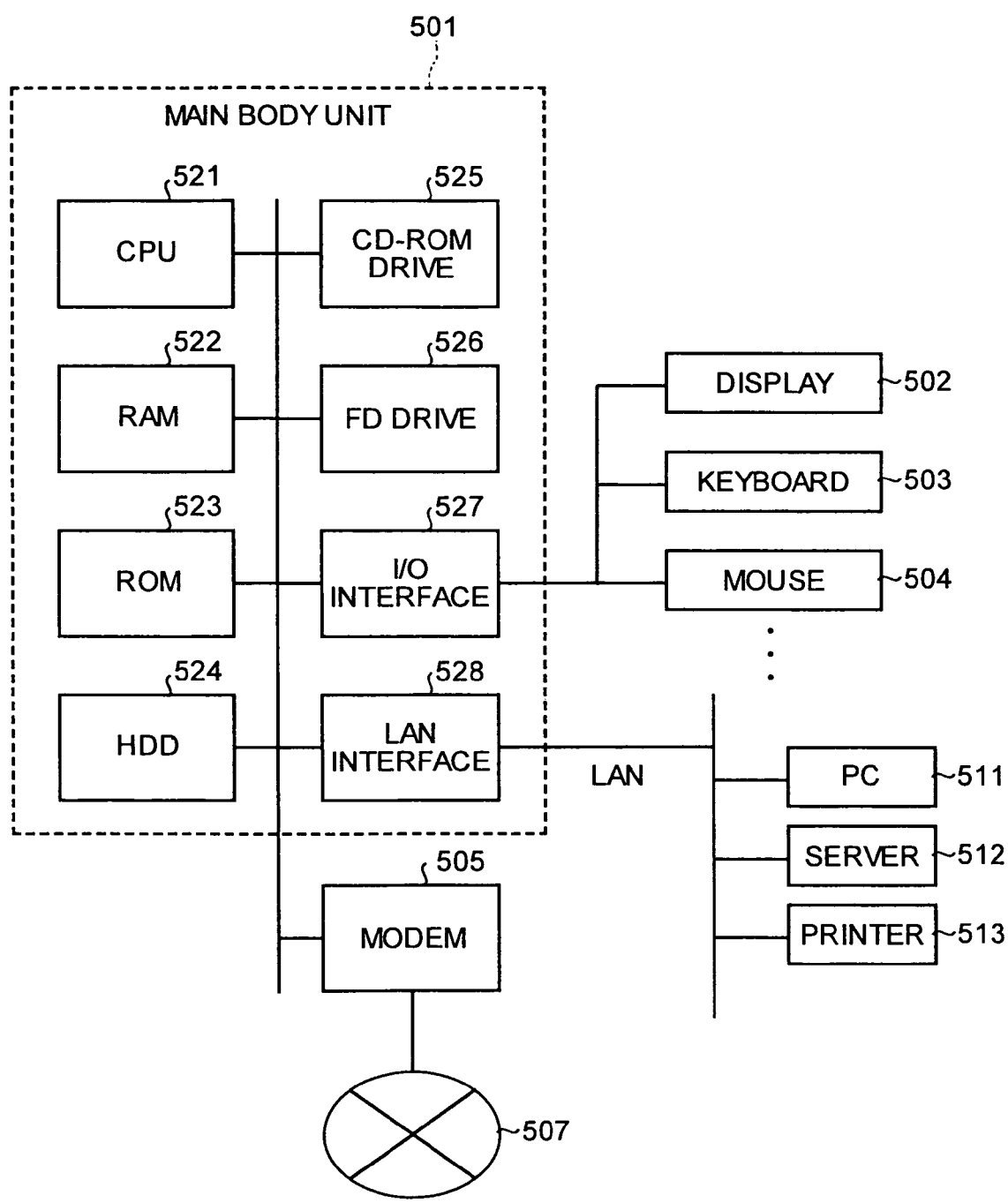
FIG. 16 is a functional block diagram of a configuration of a main body unit 501 shown in FIG. 15.

FIG. 16 is a functional block diagram of a configuration of the main body unit 501 shown in FIG. 15. As shown in FIG. 16, the main body unit 501 includes a CPU 521, a RAM 522, a ROM 523, a hard disk drive (HDD) 524, a CD-ROM drive 525, an FD drive 526, an I/O interface 527, and a LAN interface 528.

The source-code-generation supporting program executed in the computer system 500 is stored in a portable storage medium such as a floppy disk (FD) 508, a CD-ROM 509, a DVD disk, a magneto-optical disk, and an IC card, read out from the storage medium, and installed in the computer system 500. The installed motion picture distribution program is stored in the HDD 524, and executed by the CPU 521, using the RAM 522, the ROM 523, and the like.

As described above, according to the present invention, the tree-structured data is generated based on the sequence diagram indicating the specification of the source code to be newly generated, tree-structured data matching with the generated tree-structured data is retrieved from the storing unit that stores at least existing source codes and tree-structured data corresponding to the existing source codes, and the source code corresponding to the matching tree-structured data is obtained from the storing unit. Accordingly, it is not necessary to develop the source code from scratch, and a desired source code can be generated only by specifying the sequence diagram. As a result, the burden on the user can be eliminated, and the efficiency of program development can be improved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable portable storage medium that stores therein a computer program for performing, when executed by a processor, a method for supporting generation of a source code based on object orientation, the method comprising:

generating first tree-structured data based on a sequence diagram indicating a specification of a new source code to be generated, the generating the first tree-structured data including:
extracting a connection relationship between an instance and a method included in the sequence diagram; and
generating tree-structured data including first method-sequence information based on the connection relationship, the tree-structured data including at least a method name and a connection-destination class name;

generating a correspondence table representing correspondence between respective class names and instance names, based on instance names and class names included in the instances in the sequence diagram;

retrieving second tree-structured data matching with the first tree-structured data from a storing unit that stores at least an existing source code and tree-structured data corresponding to the existing source code, the retrieving including:
generating second method-sequence information for each tree-structured data extracted from the storing unit; and
matching the second method-sequence information with the first method-sequence information in respect to the method name and the connection-destination class name of the tree-structured data;

acquiring a source code corresponding to the second tree-structured data from the storing unit; and converting an instance included in the acquired source code into an instance corresponding to the sequence diagram by using the correspondence table.

2. A source-code-generation supporting method of supporting generation of a source code based on object orientation, the source-code-generation supporting method comprising:

generating first tree-structured data based on a sequence diagram indicating a specification of a new source code to be generated, the generating the first tree-structured data includes:
extracting a connection relationship between an instance and a method included in the sequence diagram; and
generating tree-structured data including first method-sequence information based on the connection relationship, the tree-structured data including at least a method name and a connection-destination class name;

generating a correspondence table representing correspondence between respective class names and instance names, based on instance names and class names included in the instances in the sequence diagram;

retrieving second tree-structured data, using a processor, matching with the first tree-structured data from a storing unit that stores at least an existing source code and tree-structured data corresponding to the existing source code, the retrieving including:
generating second method-sequence information for each tree-structured data extracted from the storing unit; and matching the second method-sequence information with the first method-sequence information in respect to the method name and the connection-destination class name of the tree-structured data;

acquiring a source code corresponding to the second tree-structured data from the storing unit; and converting an instance included in the acquired source code into an instance corresponding to the sequence diagram by using the correspondence table.

* * * * *